(No Model.)
F. A. DEPP.
COMBINED CORN SHELLER AND HUSKER.
No. 437,180. Patented Sept. 30, 1890.
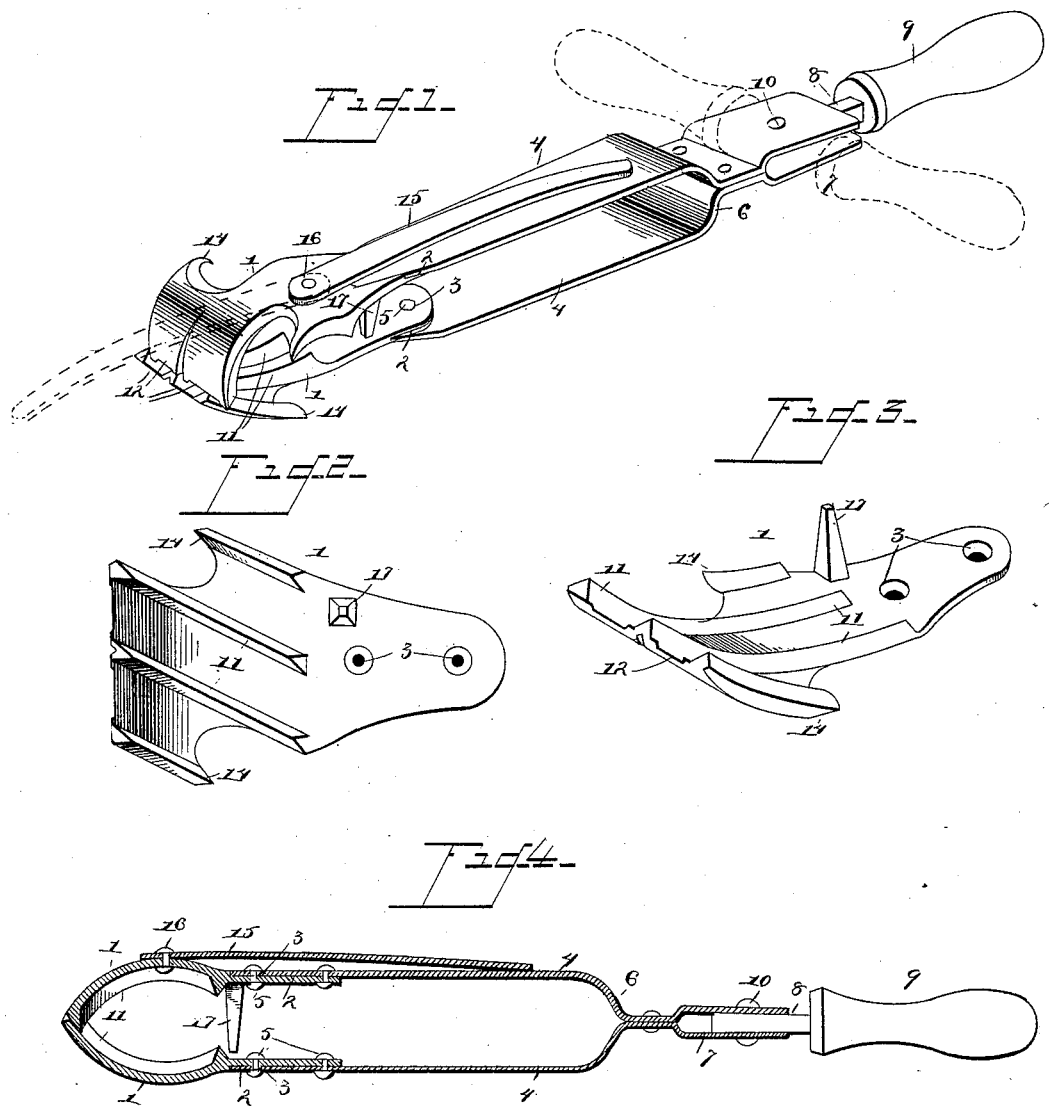
Witnesses
Geo. E. Frech.
J. W. Siggers
Inventor
Frank A Depp
By his Attorneys,
C. A. Snow & Co.

UNITED STATES PATENT OFFICE.

FRANK A. DEPP, OF BROOKVILLE, PENNSYLVANIA, ASSIGNOR OF ONE-HALF TO JAMES L. BROWN, OF SAME PLACE.

COMBINED CORN SHELLER AND HUSKER.

SPECIFICATION forming part of Letters Patent No. 437,180, dated September 30, 1890.

Application filed May 31, 1890. Serial No. 353,783. (No model.)

*To all whom it may concern:*

Be it known that I, FRANK A. DEPP, a citizen of the United States, residing at Brookville, in the county of Jefferson and State of Pennsylvania, have invented a new and useful Combined Corn Sheller and Husker, of which the following is a specification.

This invention has relation to a combined corn sheller and husker, and among the objects in view are to provide an exceedingly cheap, simple, and handy combination sheller and husker adapted to perform their functions in an extremely rapid and efficient manner.

Other objects and advantages of the invention will hereinafter appear, and the novel features thereof will be particularly pointed out in the claims.

Referring to the drawings, Figure 1 is a perspective of a combined corn sheller and husker constructed in accordance with my invention. Fig. 2 is a plan, and Fig. 3 is a detail in perspective, of one of the shelling-jaws. Fig. 4 is a longitudinal section of the device.

Like numerals of reference indicate like parts in all the figures of the drawings.

In practicing my invention I provide two jaws 1, the rear ends of which are upon their outer sides provided with recesses 2, having each a pair of openings 3. Within the recesses take the forward ends of a pair of spring-arms 4, through which and the perforations in the jaws are passed rivets 5. The spring-arms are converged near their rear end, and riveted, as at 6, and in rear of said rivets are slightly spread, as at 7, to receive the shank 8 of the reversible handle 9, through which shank and the arms is passed a rivet 10, whereby the handle is pivoted and adapted to be swung either to the right or left in accordance with the direction of movement.

The jaws 1 are each upon their inner faces provided with portions of screw-threads 11, said threads being of a V shape in cross-section and extending from the front to the rear of the curved portions of the jaws. The front edges of the jaws between the threads are beveled to form cutting-edges 12, and by reason of the jaws being curved and beveled there is a tendency of them toward the roots of the grain and the liability of slipping or passing over a grain is lessened. The threads of one jaw are disposed in a contrary direction to those of the opposite jaw, and each jaw has its outer thread of only half the length of the remaining threads, so that a finger 14 is provided at the opposite sides of each of the jaws, and the fingers of each of said jaws are oppositely disposed, so as to operate as a feed-screw when moving in either direction, and, furthermore, said fingers extend or terminate slightly beyond the plane of the threads or beveled ends of the jaws, so that they take against the grains of corn at the very bottoms or roots thereof, and therefore none of the grain is lost.

15 represents a husking-blade, which is pivoted to one of the jaws, as at 16, and when not in use is folded back upon the spring-arm connected to the jaw. The blade is slightly bent, as shown, so as to spring over the arm and bind in position thereupon.

The manner of using my invention will be understood from the above description, and may be briefly stated as follows: The jaws are separated a sufficient distance to introduce the ear of corn, and the ear is taken by the left hand while the device is grasped by the right and the latter is rotated, and by reason of the disposition of the threads of the jaws the sheller is fed toward the hand of the operator. By revolving the device toward the operator a reverse feeding of the device takes place, so that the same is capable of shelling corn whichever way it may be rotated. The ends of the threads take under two or more rows of corn at a time, and the same are removed with great rapidity from the cob. If desired, I provide one of the jaws in rear of the curved portion with an inwardly-disposed lug 17, which lug limits the compression of the two jaws with relation to each other, and also acts as a stop and prevents unusually-large cobs from escaping from the rear and from between the jaws, and at the same time serves a similar purpose upon smaller cobs when the springs have become somewhat weakened from use.

From the above construction it will be apparent that I have provided an extremely simple and economical device, capable of shelling and husking corn with great rapidity and ease.

Having thus described my invention, what I claim is—

1. A corn-sheller comprising two shelling-jaws connected by spring-arms, one of said jaws being provided with a husking-blade pivoted thereto and adapted to be swung outward from the same when in use and rearwardly over the arm when not in use, substantially as specified.

2. In a corn-sheller, the combination of opposite shelling-jaws, opposite arms formed of spring metal connected at their front ends to the jaws and converged at their rear ends, and a handle secured between and clamped by said arms, substantially as specified.

3. In a corn-sheller, the combination of opposite shelling-jaws, the inner faces of which are oppositely threaded, each of said jaws terminating at its opposite sides in oppositely-disposed feed-fingers extending beyond the plane of the threads, substantially as specified.

4. In a corn-sheller, the combination of opposite shelling-jaws, oppositely curved and internally threaded, said jaws being provided with beveled cutting-edges and spring-arms connected to the jaws and to each other and terminating at their rear ends in a reversible handle, substantially as specified.

5. The combination, with the shelling-jaws and the spring-arms secured together in front of and diverged near their ends, of the handle pivoted in said arms between the diverged portions and having opposite flat faces, substantially as specified.

In testimony that I claim the foregoing as my own I have hereto affixed my signature in presence of two witnesses.

FRANK A. DEPP.

Witnesses:
W. E. DEPP,
H. H. BROSIUS.